ARALKYL:

ARYLARALKYL

ALKENE:

$-CH_2-CH=CH-CH_2-$ , $-CH_2-CH=C-CH_3$ , $-CH=CH-CH=CH-$ ,

POLYMERIC:

(WHERE n MAY BE FROM 1 to 50)

BICYCLIC:

Dec. 18, 1973  P. A. ARGABRIGHT ET AL  3,779,968
GEL COMPOSITION
Filed Aug. 23, 1971  2 Sheets-Sheet 2

United States Patent Office 3,779,968
Patented Dec. 18, 1973

3,779,968
GEL COMPOSITION
Perry A. Argabright, Larkspur, and C. Travis Presley, Littleton, Colo., assignors to Marathon Oil Company, Findlay, Ohio
Filed Aug. 23, 1971, Ser. No. 173,892
Int. Cl. C08f 45/24
U.S. Cl. 260—29.6 BM                     8 Claims

ABSTRACT OF THE DISCLOSURE

A gel composition sufficiently stable to support its own weight having elasticity and cohesive character produced by contacting, at a pH above 7, polyvinyl alcohol with a compound which contains more than one isocyanurate salt group.

CROSS REFERENCES TO RELATED APPLICATIONS

The following U.S. patent applications relate to compounds and uses which are generally related to the present invention: Ser. Nos. 317,884 filed Dec. 26, 1972; 317,883 filed Dec. 26, 1972; 173,759 filed Aug. 23, 1971; and 260,843, filed June 8, 1972.

BACKGROUND OF THE INVENTION

Field of the invention

The present invention relates generally to the field of isocyanurate-containing organic compositions generally classified within Class 260, subclasses −248 and −88.3 of the United States Patent Office, and to organic gels generally classified in Class 252–316.

Description of the prior art

Gelling agents can be used to control the penetration of polyvinyl alcohol (PVA) solutions into porous substrates or to prevent runoff of coatings applied by dipping. Reagents capable of gelling polyvinyl alcohol solutions include certain dyes and aromatic hydroxy compounds, which form thermally reversible gels, and inorganic complexing agents, which form thermally stable gels. Most gelling agents are effective only with fully hydrolyzed grades of polyvinyl alcohol. (See, for example, Du Pont Brochure A60980 "Elvanol" polyvinyl alcohol.)

Dyes have acted as gelling agents for solutions of fully hydrolyzed polyvinyl alcohol. The amount required varies with the dye as well as with the PVA concentration. As an example, a 10% solution of PVA 71–30 containing 3% Congo Red, based on dry weight of PVA, was fluid and easily applied at temperatures above 50° C. (122° F.) but was a firm gel at room temperature.

Organic compounds that have been reported (see U.S. Pats. 2,249,536; 2,249,537; 2,249,588) to form thermally reversible gels without imparting color include resorcinol, catechol, phloroglucinol, salicylanilide, gallic acid, and 2,4-dihydroxybenzoic acid.

Borax is an effective gelling agent for polyvinyl alcohol solutions. Since gelation occurs rapidly after contact and is not reversible on heating, borax is best utilized in two-stage treatments, as in the Elvasize Process, where the PVA and borax solutions are applied separately and complex formation occurred on the substrate. Alternatively, boric acid can be incorporated in the solution of PVA to form a soluble complex, which was converted to the gel form on contact with alkali.

Other inorganic gelling agents include systems containing vanadates, trivalent chromium (produced by in situ reduction of an alkali metal chromate or dichromate), and tetravalent titanium. The latter can be added in the form of potassium titanium oxalate, or produced in situ by oxidation of titanium trichloride. These systems permit some control of gelation rate by adjusting the oxidation or reduction conditions, or, as in the case of potassium titanium oxalate, by adjusting the pH.

Sodium carbonate, in sufficient concentrations, can be used to precipitate PVA from solution in a form that can be separated from the water. Sodium and potassium sulfate also act as precipitants at relatively low concentrations.

SUMMARY OF THE INVENTION

General statement of the invention

The present invention relates to a new class of compositions which are useful as gels, e.g., in forming plugs such as for pipe line separation pigs etc. These compositions are produced by contacting polyvinyl alcohol with a compound characterized by containing in a single molecule the following groups: metal isocyanurate,

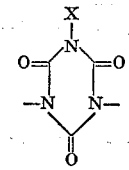

with or without isocyanurate,

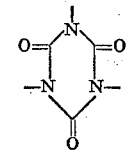

The gelling agents of the present invention have the advantage of giving a controllable time to onset of gelation. That is, by merely adjusting the pH of the initial solution, the gelation time may be controlled, a feature not available with conventional systems.

The isocyanurate compounds of the present invention have the general structure shown in FIG. 1; where:

R=divalent hydrocarbon or substituted hydrocarbon radical, as described below and exemplified in FIG. 2.
X=a metal, or hydrogen or quaternary ammonium (which, for the purposes of this invention, acts like a metal) or a combination thereof. Particularly preferred are hydrogen, quaternary ammonium and meals selected from the following groups of the Periodic Table: Ia, Ib, IIa, IIb, IIIa, IIIb, IVa, IVb, Va, Vb, VIa; including such metals as Li, Na, K, Rb, Cs, Ag, Au, Be, Mg, Ca, Sr, Ba, Ra, Zn, Cd, Hg, B, Al, Sc, Y, La, and the other rare earths, Ac, Ga, In Tl, Ti, Zr, Hf, Ge, Sn, Pb, V, Nb, Ta, Sb, Bi, Cr, Mo, W, Mn, Fe, Ru, Co, Ni, Rh, Pd, Os, and Ir.
A=a monovalent organic radical selected from the following: isocyanate (—NCO), urethane (—NHCO$_2$R′), urea (—NHCONHR′), amino (—NH$_2$), —NHR′, —NR$_2$′, or R′, for example.
R′=monovalent hydrocarbon or substituted hydrocarbon radical, as discussed below;
$m$=average number of trisubstituted isocyanurate rings and is a positive number from 0 to about 400, and most preferably from 0 to about 200.
$n$=average number of isocyanuric acid and/or isocyanurate salt groups and is a positive number from above 1 to about 10,000, more preferably from 2 to about 1000, and most preferably from 3 to about 100.

$2m+n+1$ = average number of divalent R groups and is a positive integer from 2 to about 11,000, more preferably from 3 to about 11,000, more preferably from 3 to about 1,100 and most preferably from 4 to about 140.

$m+2$ = average number of A groups and is a positive integer from 2 to about 2,000, more preferably from 2 to about 400 and most preferably from 2 to about 200;

and wherein there are no N-to-N bonds and no A-to-N bonds and no A-to-A bonds and no R-to-R bonds.

R preferably contains 2 to 40, more preferably 2 to 30, and most preferably 2 to 18 carbon atoms.

R' preferably contains 1 to 40 carbon atoms, more preferably 1 to 20 carbon atoms and most preferably 1 to 10 carbons, for example,

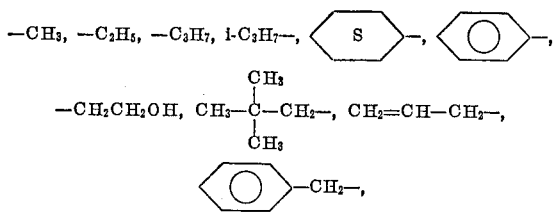

etc.

R and/or R' can be substituted with groups that do not interfere in the products' subsequent utility or in its preparation. Examples of such non-interfering groups are: $-NO_2$, Cl, F, Br, I, CN, $-CO_2R''$, $-CO-R''$, $-O-R''$, $-SR''$, $-NR_2''$ $-CONR_2''$, $-SO_3R$, $-SO_2-$, $-SO-$, phenyl, naphthyl, alkyl (1–40 carbon atoms) $-PO_3R''$, cyclohexyl, cyclopropyl, $-OCOR''$, $$-\overset{H}{\underset{|}{N}}COR''$$

etc. where R" may be hydrogen, lower alkyl (e.g., ethyl, hexyl) or aryl (e.g. monovalent radicals corresponding to the aryl radicals described in FIG. 2. The examples of R (shown in FIG. 2) are set forth for purposes of elucidation, not restriction.

It will be recognized that the values of $m$ and $n$ described above are on the basis of the integers which will be used to describe a single molecule. In actual practice, the invention will involve mixtures of molecules of the general form described above. Thus, the average value of $m$ for the mixture may be from about 1 to about 2000, more preferably from about 1 to 400, and most preferably from about 1 to 200; the average value of $n$ may be from about 0.5 to 10,000, more preferably from about 0.5 to 1000, and most preferably from about 0.5 to 100.

Utility of the invention

The present invention relates to a new and novel class of gels, their preparation, and processes for their use. For example, the compositions of the present invention can be used as gels in pipe line separation devices, e.g., according to the techniques of U.S. Pats. 3,473,572; 3,225,787 and 3,209,771, and in electrophoresis gels such as those taught in U.S. Pat. 3,576,727. Other uses include: cast films, encapsulating media, e.g., for electronic devices, molds, fillers for water beds and other filled plastic flexible envelopes, etc.

DESCRIPTION OF THE PREFERRED EMBODIMENTS

Figure 1:
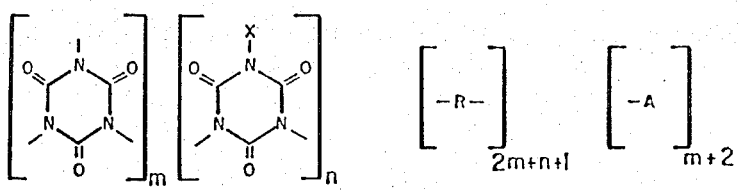
FIG. 1 shows the general formula of the organic starting materials of the present invention.
Figure 3:
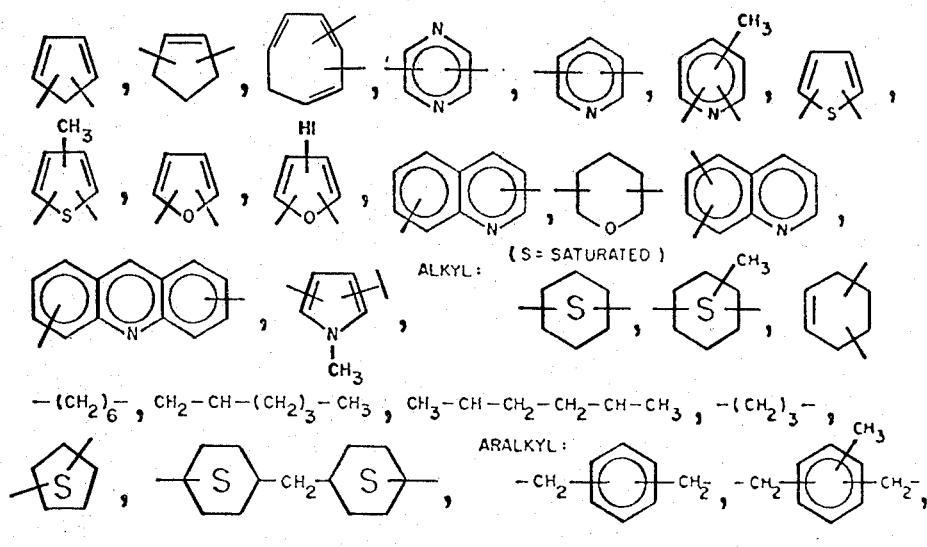
FIGS. 2 and 3 exemplify some of the possible structures of R groups of the starting materials and products of the present invention.
Figure 3:
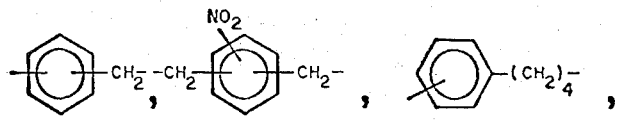
Figure 3:
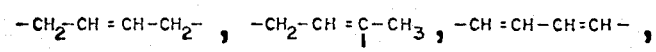
Figure 3:
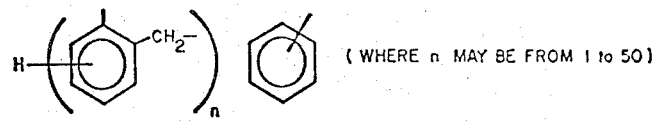
Figure 3:
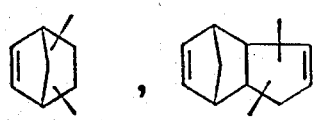
Figure 2:
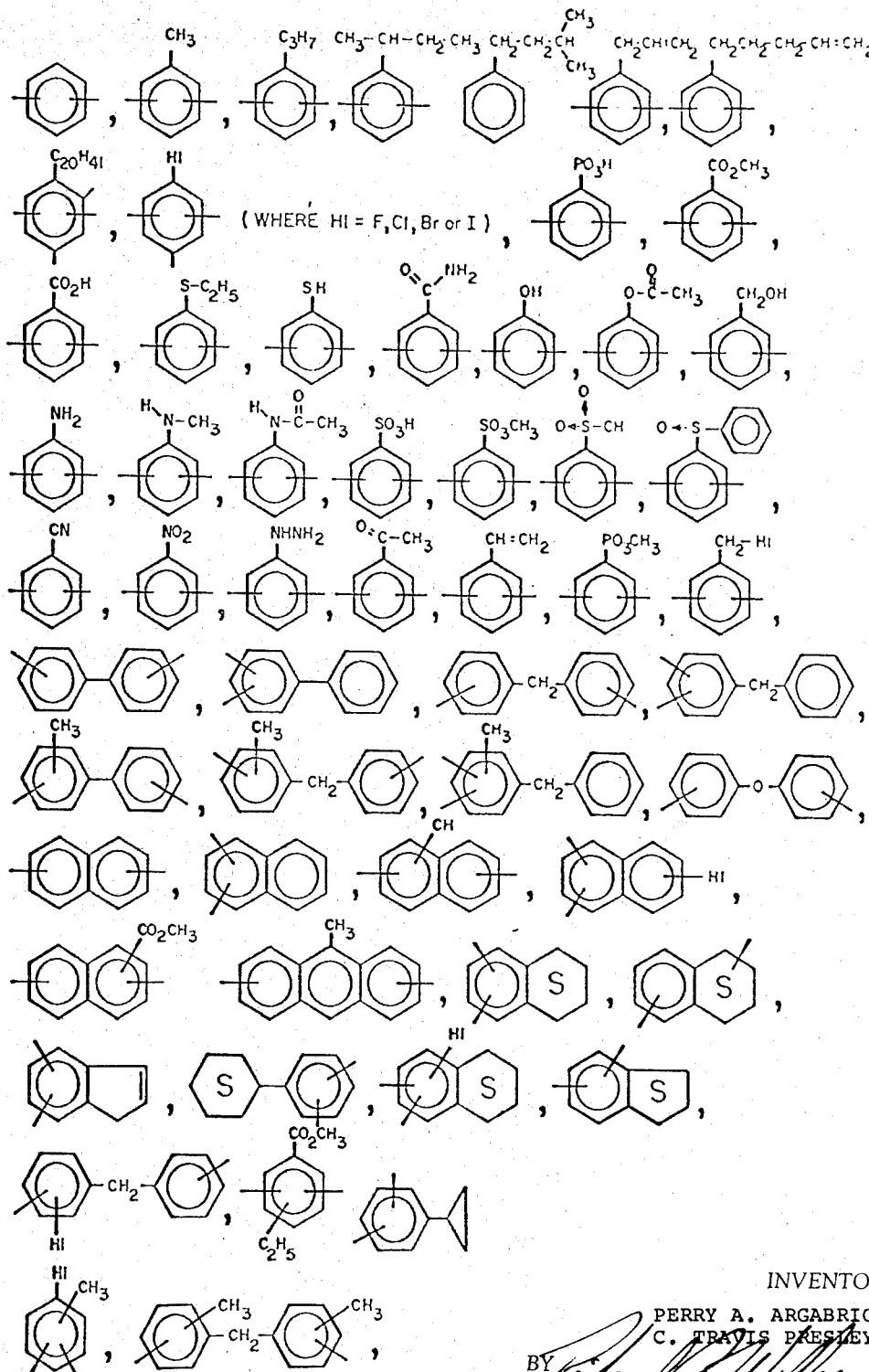

It has been discovered that aqueous solutions of the aforementioned polyisocyanurate salts, of the general formula shown in FIG. 1 (where the lettered groups are as described above under "Summary of the Invention"), when contacted with polyvinyl alcohol under basic conditions (i.e., pH in excess of 7), give the gels of the present invention.

Starting materials

The starting materials for the present invention are:

Salts of polyisocyanuric acids: These are produced according to the techniques taught in copending U.S. Pat. 3,573,259, by reacting a metal cyanate and an organic diisocyanate in the presence of an aprotic solvent to form isocyanurate-containing polyisocyanate metal salts. Preferably 0.5 to about 50% by weight, more preferably 1.0 to about 25% by weight, and most preferably 2.0 to about 10% by weight will be contacted with the polyvinyl alcohol.

Polyvinyl alcohol: The polyvinyl alcohol used in the present invention can be of commercial quality such as that marketed by Monsanto Company of St. Louis, Mo., under the trade name Gelvatol. It should have a molecular weight within the range of from about 2,000 to about 250,000, more preferably from 3,000 to about 200,000, and most preferably from 10,000 to about 126,000. In general, about 1.0 to about 10.0, more preferably 2.0 to about 6.0, and most preferably 3.0 to about 5.0% by wt. of polyvinyl alcohol will be contacted with the aforementioned isocyanurate salt starting materials.

Bases: While not narrowly critical, the bases employed with the present invention will preferably be alkali metals, metal hydroxides, e.g., NaOH, KOH, LiOH, and alkaline earth metal hydroxides, e.g., $Ca(OH)_2$, etc. The alkali metal hydroxides will be more preferred, with sodium hydroxide being the most preferred of the bases. In general, the pH will be adjusted into a range above 7, more preferably from about 7.5 to about 15, and most preferably from about 12 to about 15.

Reaction media: Water or mixtures of water and an alcohol, ketone, ester, amide, sulfoxide, sulfone, etc.

Temperature: While not narrowly critical, temperatures in the range from 0 to about 65° C. are preferred, with 10 to 50° C. being more preferred and 15–40° C. being most preferred. The lower limit is generally the freezing point of the solution and the upper limit is generally the thermal instability point of the gel at the reaction pressure.

Pressure: While not narrowly critical, the reaction can be carried out at pressures of from 0.5 to 100, with 0.6 to 50 being more preferred, and 0.7 to 10 atmospheres being most preferred.

Time: The reaction time, of course, is dependent on the initial concentration of the starting materials and the temperature. The preferred time is from 0.01 to 4500 hours, more preferred 0.05 to 350 hours, and most preferred from 0.06 to 200 hours.

EXAMPLES

Example I

Preparation of polyisocyanurate salt: To a stirred slurry of 82.4 KOCN (1.02 mole) in 2000 ml. of dimethylformamide (DMF) at 75° C., 161 g. of tolylene diisocyanate (0.93 mole) is added at a rate of 0.42 ml./min. by means of a syringe pump.

The entire operation is carried out in a nitrogen atmosphere. Following the addition, the reaction mixture is stirred an additional 5 minutes, dry methanol added (large excess) and allowed to react for an additional hour to insure complete quenching. The major product is insoluble in DMF and thus readily separated by a single filtration. A trace DMF soluble product is obtained after solvent stripping the filtrate. After vacuum drying at 80° C. to remove residual DMF and methanol, the following yield and analytical data are obtained:

| Product | Percent yield [1] | Aryl/end group [2] ratio $(2m+n+1/m+2)$ | Average mol. wt. (minimum) |
|---|---|---|---|
| DMF insoluble [3] | 93.3 | 17.0 | 8,000 |
| DMF soluble | 6.3 | 1.9 | 950 |

[1] Corrected for residual DMF.
[2] Measured by nuclear magnetic resonance spectroscopy.
[3] Contains 12.1% DMF of solvation.

Examples II–XI

The following formulations (percent by weight in water) produced dimensionally stable gels using the product (PI) of Example I. In each case, the PVA and base were dissolved in a single water solution to which was added a solution of PI and water sufficient to reach the indicated concentrations. The resulting mixture was allowed to stand at ambient temperature and gelation occurred within times ranging from three hours to about one week.

| Example | Weight percent | | | Viscosity of 4% by wt. PVA soln., cps. | Remarks |
|---|---|---|---|---|---|
| | PI | NaOH | PVA | | |
| II | 4 | 2 | 4 | 28–32 | White, opaque. |
| III | 4 | 2 | 4 | 55–65 | Do. |
| IV | 4 | 4 | 4 | 55–65 | White, opaque, 6% supernatant liquid. |
| V | 1 | 4 | 4 | 28–32 | Blue haze, transparent. |
| VI | 1 | 4 | 4 | 55–65 | Do. |
| VII | 3 | 2 | 5 | 28–32 | White, opaque. |
| VIII | 3 | 2 | 5 | 55–65 | Do. |
| IX | 3 | 4 | 5 | 4–6 | Do. |
| X | 3 | 4 | 5 | 28–32 | Do. |
| XI | 3 | 4 | 5 | 55–65 | Do. |

Examples XII–XVII

When the following examples were conducted according to the techniques of the preceding examples, in each case no gel was formed. These examples serve to indicate the unexpectedness of the gelation property of the compositions of the present invention.

| Example | Weight percent | | Polymer | Other ingredients | Viscosity of polymer soln., cps.[1] | Remarks |
|---|---|---|---|---|---|---|
| | PI | NaOH | | | | |
| XII | 0 | 2 | PVA (4 weight percent) | Sodium diphenyl-isocyanurate | 55–65 | No gel. |
| XIII | 3 | 4 | Polyacrylamide [2] | None | 29 | Do. |
| XIV | 3 | 5 | Sodium carboxymethyl cellulose | do | 36 | Do. |
| XV | 3 | 4 | Polyox coagulant [3] | do | 26 | Do. |
| XVI | 3 | 4 | Polyvinyl pyrrolidone | do | 6 | Do. |
| XVII | 3 | 4 | Kelco Superloid [4] | do | 24 | Do. |

[1] At 6 r.p.m. using a Brookfield viscometer.
[2] Dow Chemical "Pusher 700."
[3] Union Carbide's ethylene oxide polymer.
[4] Kelco Company's alginic acid derivative.

MODIFICATIONS OF THE INVENTION

It should be understood that the invention is capable of a variety of modifications and variations which will be made apparent to those skilled in the art by a reading of the specification and which are to be included within the spirit of the claims appended hereto.

What is claimed is:

1. A gel composition substantially insoluble in water prepared by reacting at a pH above 7, an alkali metal hydroxide or alkaline earth metal hydroxide with a compound containing metal isocyanurate groups, in the presence of polyvinyl alcohol and having the general structure:

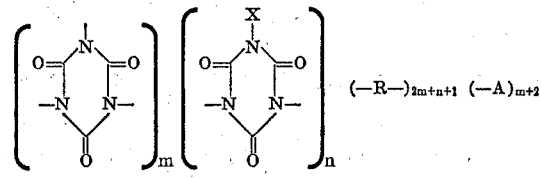

wherein:
R = divalent hydrocarbon radical or hydrocarbon radical substituted with groups selected from the class consisting of: —$NO_2$, Cl, F, Br, I, CN, —$CO_2R''$,

—CO—R'',

—O—R'', —SR'', —$NR_2''$, —$CONR_2''$, —$SO_3R$,

—$SO_2$—,

—SO, phenyl, naphthyl, alkyl (1–40 carbon atoms),

—$PO_3R''$, cyclohexyl, cyclopropyl, —OCOR'', $$-\overset{H}{\underset{|}{N}}COR''$$

where R'' is hydrogen, lower alkyl or monovalent radical corresponding to the aryl radicals described below:

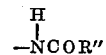

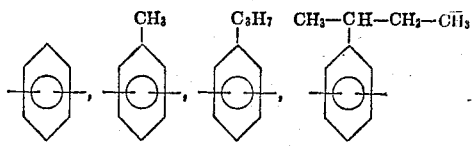

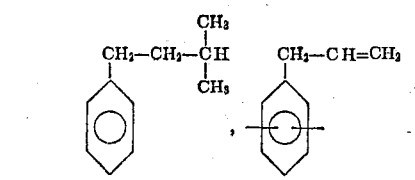

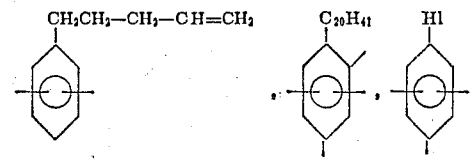

where Hl = F, Cl, Br or I,

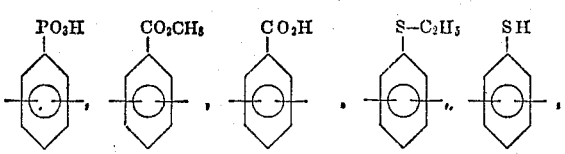

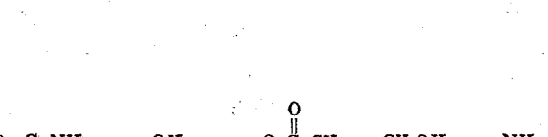

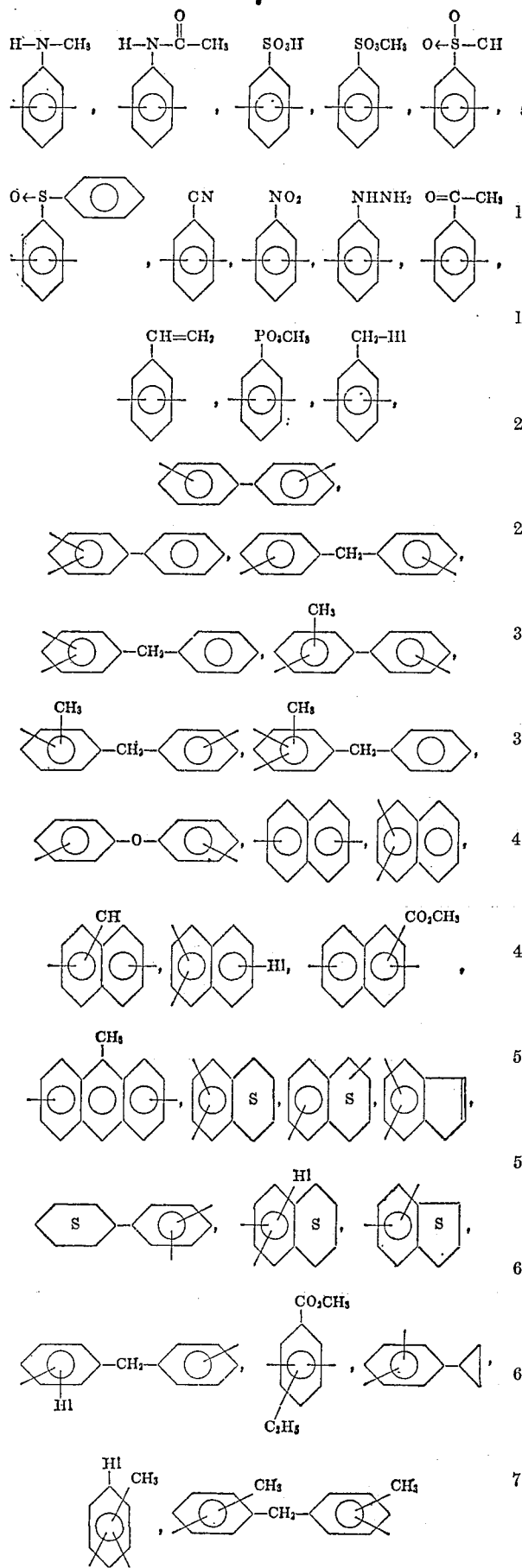

wherein R contains 2 to about 40 carbon atoms,

X is selected from the group consisting of metals, hydrogen, and quaternary ammonium radicals, A is a monovalent organic radical selected from the group consisting of —NCO—NHCO$_2$R', —NHCONHR', —NH$_2$, —NHR', —NR'$_2$, and R', wherein R' is a monovalent hydrocarbon radical or substituted hydrocarbon radical containing from 1 to about 40 carbon atoms, wherein the substituents in said substituted hydrocarbon radical are —NO$_2$, Cl, F, Br, I, CN,

—CO$_2$R'',

—COR'', —OR'', —SR'', —NR$_2$'', —SO$_3$R, —SO$_2$—, —SO—, phenyl, naphthyl, alkyl (1–40 carbon atoms), —PO$_3$R'', cyclohexyl, cyclopropyl, —OCOR'' and $$-\overset{H}{\underset{|}{N}}COR''$$

wherein R'', is H, lower alkyl or aryl corresponding to the aryl radicals set forth above for R, and wherein $m$ is the average number of trisubstituted isocyanurate rings per molecule and is a positive number from zero to about 400, $n$ is the average number of isocyanurate acid and/or isocyanurate salt groups and is a positive number from above 1 to about 10,000, wherein $2m+n+1$=the average number of divalent R groups and is a positive integer from 2 to about 11,000, and wherein $m+2$ is the average number of A groups and is a positive integer from 2 to about 2,000, and wherein there are no N-to-N bonds and no A-to-N bonds, and no A-to-A bonds and no R-to-R bonds, wherein from about 1.0 to about 10 weight percent of said polyvinyl alcohol is contacted with from about 1.0 to about 25 weight percent of said polyisocyanurate salt.

2. A composition according to claim 1 wherein R is selected from the group of organic radicals shown at the end of this claim:

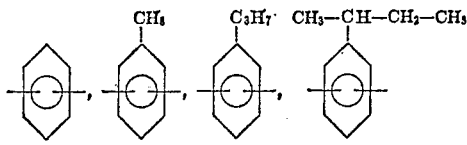

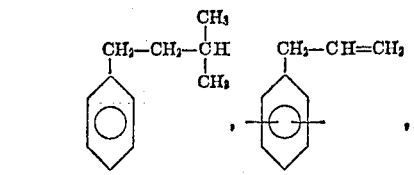

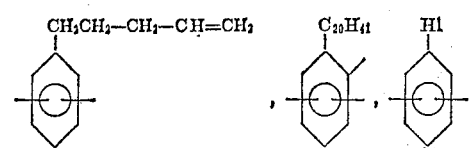

where Hl=F, Cl, Br or I,

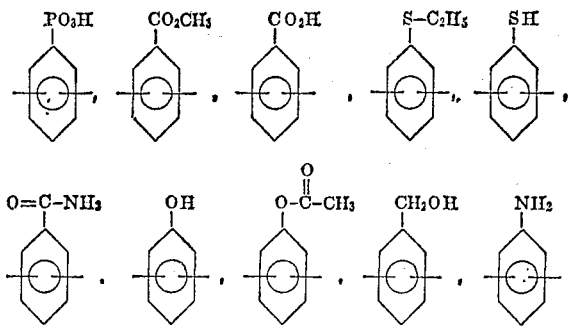

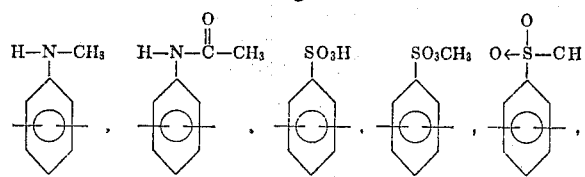

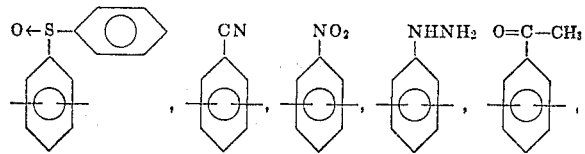

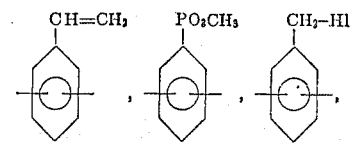

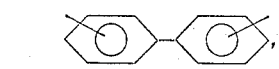

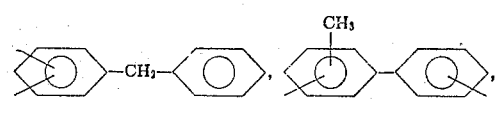

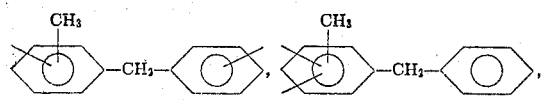

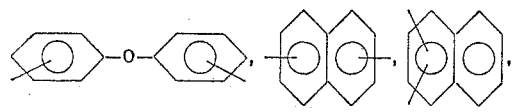

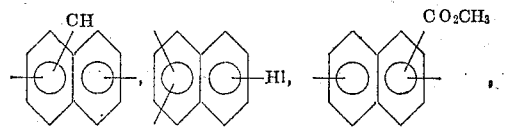

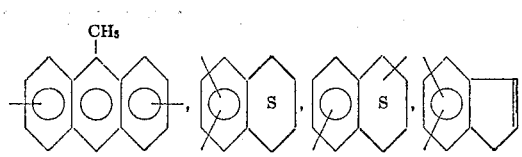

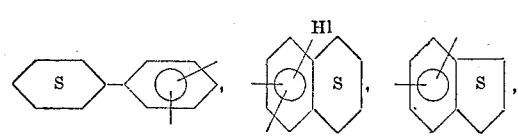

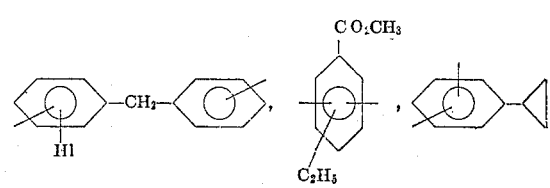

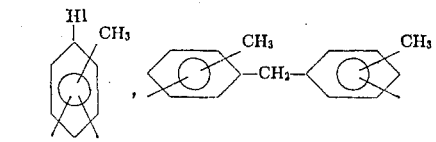

3. Compositions according to claim 1 wherein X is selected from the group consisting of hydrogen, quaternary ammonium radicals and metal radicals selected from the following groups of the Periodic Table; I$a$, I$b$, II$a$, II$b$, III$a$, III$b$, IV$a$, IV$b$, V$a$, V$b$, VI$a$.

4. Compositions according to claim 1 wherein $m$ is a positive integer from 0 to about 200, wherein $n$ is a positive integer from 3 to about 100, and wherein $2m+n+1$ is a positive integer from 4 to about 140, and wherein $m+2$ is a positive integer from about 2 to about 200.

5. Compositions according to claim 1 wherein R is selected from the group of organic radicals shown in the following structure:

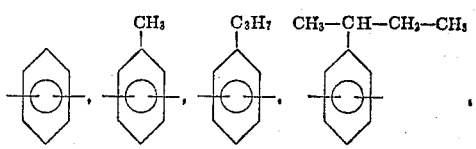

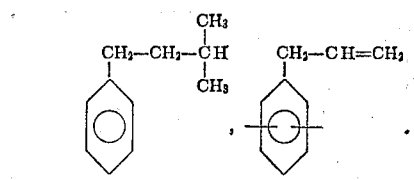

where Hl=F, Cl, Br or I,

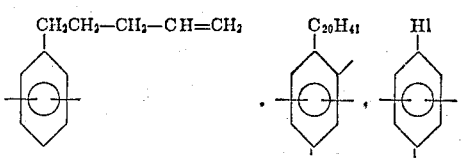

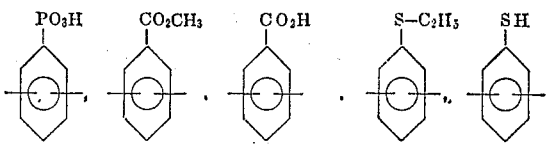

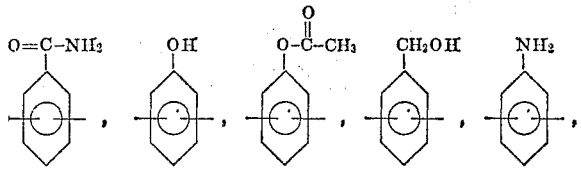

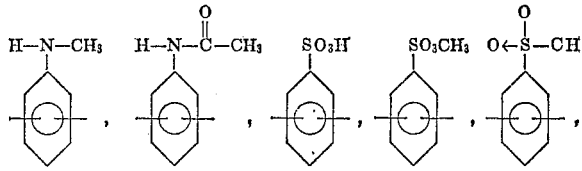

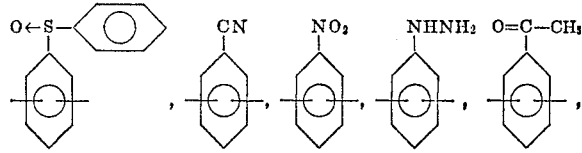

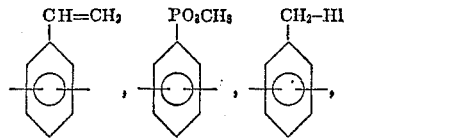

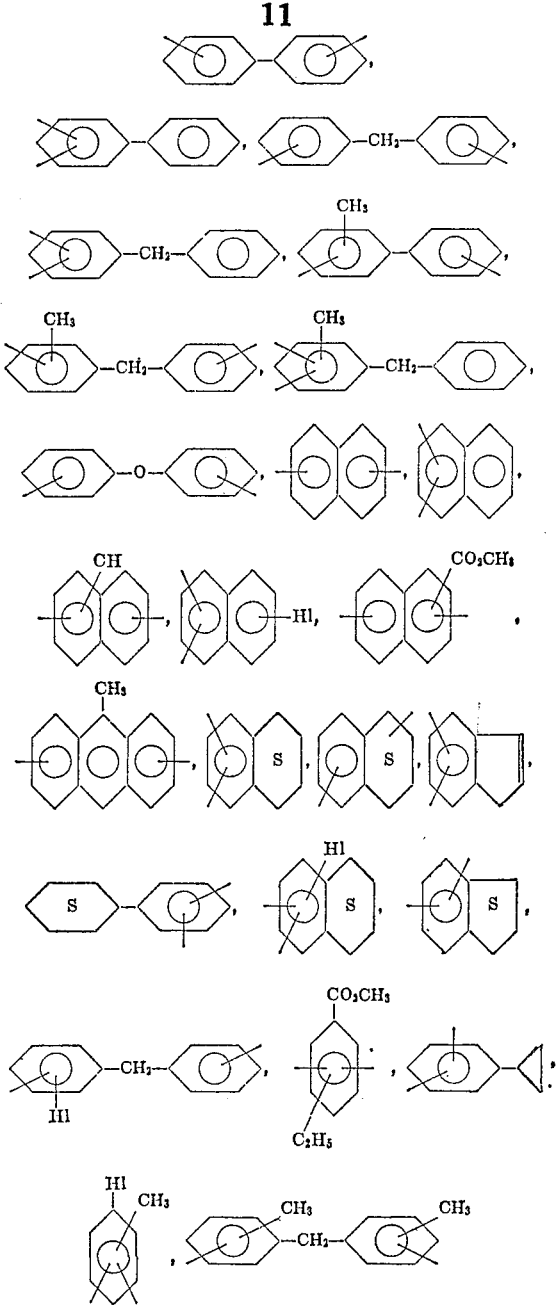

and the substituted derivatives thereof which are substituted with radicals selected from the group consisting of —$NO_2$, Cl, F, Br, I, CN, —$CO_2R''$, —CO—$R''$,

—O—$R''$,

—$SR''$, —$NR_2''$, —$CONR_2''$, —$SO_3R$, —$SO_2$—, —SO—, phenyl, naphthyl, alkyl (1–40 carbon atoms), $PO_3R'$, cyclohexyl, cyclopropyl, —$OCOR''$, $$-\overset{H}{\underset{|}{N}}COR''$$

where $R''$ is hydrogen, lower alkyl or aryl corresponding to the aryl radicals set forth in claim 1 for R.

6. Compositions according to claim 1 wherein R' contains from 1 to 10 carbon atoms and is selected from the group consisting of —$CH_3$, —$C_2H_5$, —$C_3H_7$, $i$=$C_3H_7$—, ⟨S⟩—, ⟨O⟩—, —$CH_2CH_2OH$, $CH_3$—$\underset{\underset{CH_3}{|}}{\overset{\overset{CH_3}{|}}{C}}$—$CH_2$—, $CH_2$=CH—$CH_2$—, ⟨O⟩—$CH_2$—

7. Compositions according to claim 1 wherein X is selected from the group consisting of: Li, Na, K, Rb, Cs, Ag, Au, Be, Mg, Ca, Sr, Ba, Ra, Zn, Cd, Hg, B, Al, Sc, Y, La, and the other rare earths, Ac, Ga, In, Tl, Ti, Zr, Hf, Ge, Sn, Pb, V, Nb, Ta, Sb, Bi, Cr, Mo, W, Mn, Fe, Ru, Co, Ni, Rh, Pd, Os, and Ir.

8. A composition according to claim 1, wherein said polyvinyl alcohol is contacted with from about 2.0 to about 10 weight percent of said polyisocyanurate salt.

References Cited
UNITED STATES PATENTS

| | | | |
|---|---|---|---|
| 3,591,543 | 7/1971 | Stafford | 260—29.6 BM |
| 3,573,259 | 3/1971 | Argabright et al. | 260—77.5 NC |
| 2,249,537 | 7/1941 | McDowell et al. | 260—29.6 BE |
| 2,582,357 | 1/1952 | Sargent | 260—29.6 B |
| 3,037,979 | 6/1962 | Fukui et al. | 106—176 X |

RICHARD D. LOVERING, Primary Examiner

U.S. Cl. X.R.

137—561 R, 802; 204—299; 252—316; 260—29.6 B, 29.6 BE

UNITED STATES PATENT OFFICE
CERTIFICATE OF CORRECTION

Patent No. 3,779,968            Dated Dec. 18, 1973

Inventor(s) P. A. Argabright et al

It is certified that error appears in the above-identified patent and that said Letters Patent are hereby corrected as shown below:

| | |
|---|---|
| Col. 2, line 52: | Delete "meals" and insert therfor --metals--. |
| Col. 3, lines 2-3: | Delete "more preferably from 3 to about 11,000" |
| Col. 5, line 12: | Delete "2" and insert therefor --3--. |
| Col. 5, line 45: Ex. XIV | Delete "5" and insert therefor --4--. |
| Col. 6, line 19: | Delete "below:". |
| Col. 8, line 12: | After "-$NR_2$"," insert -- -$CONR_2$",-- |

Signed and Sealed this

Sixth Day of September 1977

[SEAL]

Attest:

RUTH C. MASON      LUTRELLE F. PARKER
*Attesting Officer*      *Acting Commissioner of Patents and Trademarks*